Dec. 3, 1935.    F. T. COPE    2,023,354
METHOD OF AND APPARATUS FOR BRAZING
Filed Aug. 9, 1933    2 Sheets-Sheet 1
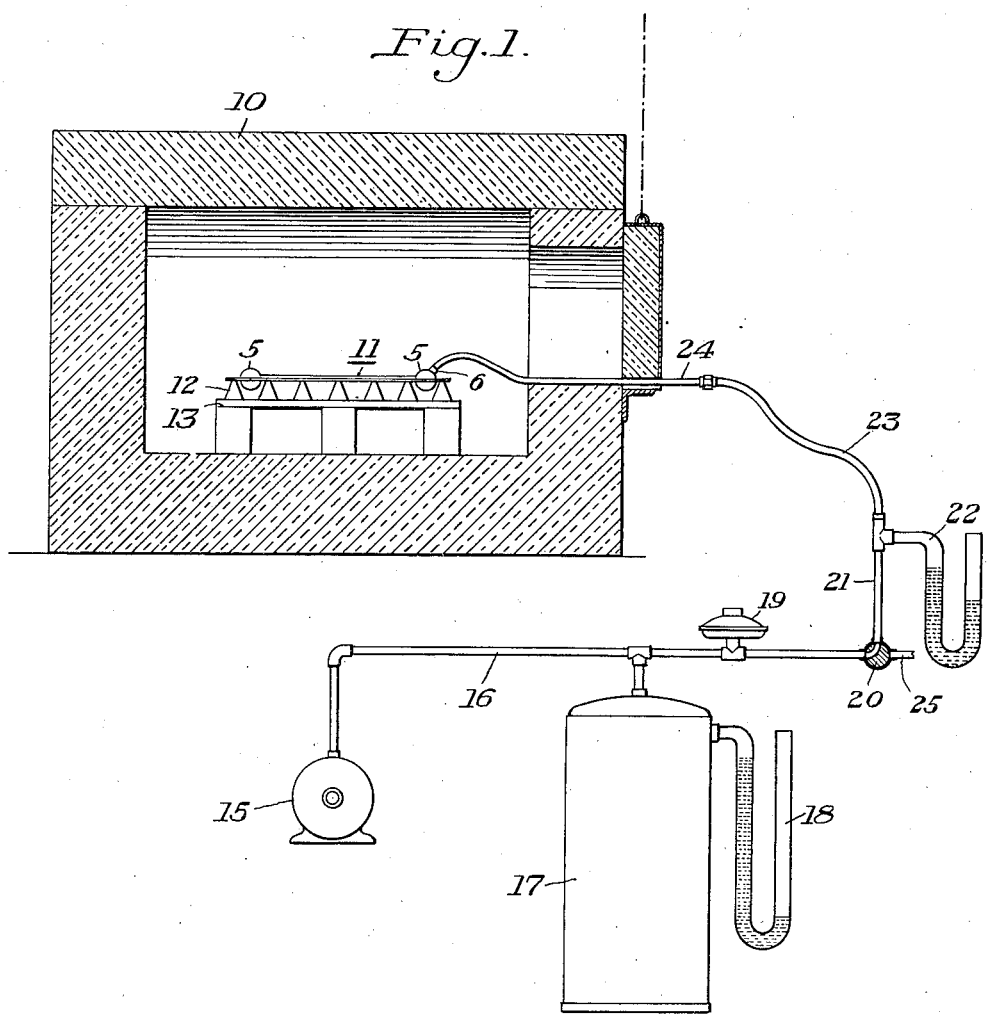
INVENTOR
Frank T. Cope
by Byrnes, Stebbins, Parmelee & Blenko
His Attys Dec. 3, 1935.                F. T. COPE                2,023,354
                METHOD OF AND APPARATUS FOR BRAZING
                    Filed Aug. 9, 1933        2 Sheets-Sheet 2
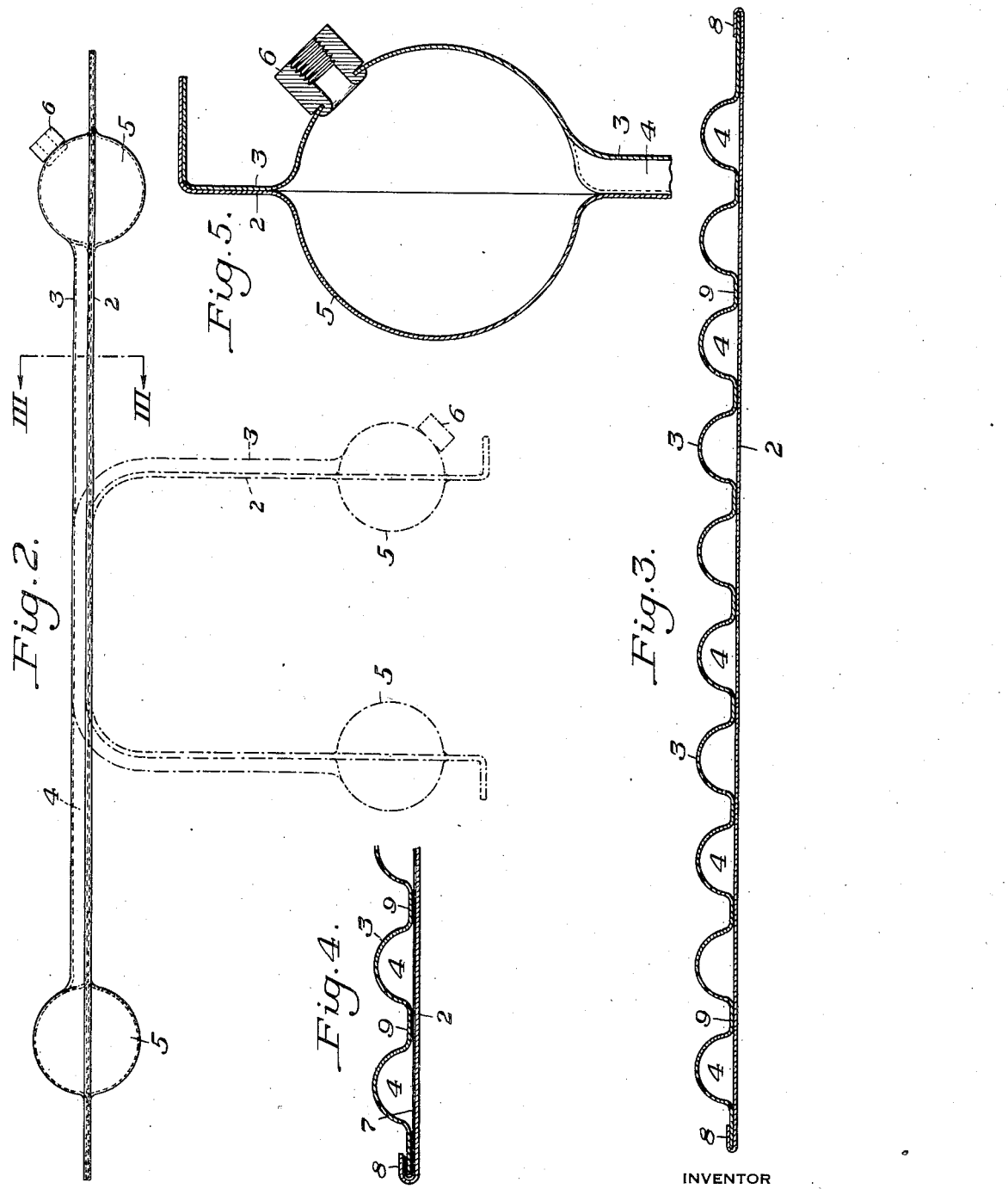
INVENTOR Patented Dec. 3, 1935

2,023,354

UNITED STATES PATENT OFFICE 2,023,354

METHOD OF AND APPARATUS FOR BRAZING

Frank T. Cope, Salem, Ohio, assignor to The Electric Furnace Company, Salem, Ohio, a corporation of Ohio Application August 9, 1933, Serial No. 684,434

6 Claims. (Cl. 113—59)

This invention relates to a method of and apparatus for brazing. Although the invention is applicable to the brazing of metal parts in general, it is described herein particularly as applied to the brazing together of metal sheets in the formation of an evaporator for a refrigerator.

In the accompanying drawings, which illustrate a preferred embodiment of my invention, Figure 1 is a diagrammatic illustration of the whole apparatus;

Figure 2 is a side elevation illustrating in full lines an evaporator before it is bent into final shape, and in chain lines the evaporator in its final form;

Figure 3 is a section on the line III—III of Figure 2;

Figure 4 is an enlarged section similar to Figure 3 except that it shows the parts spaced apart for clearness of illustration; and Figure 5 is a section through a portion of the evaporator illustrating the suction connection thereto.

Refrigerator evaporators are made by brazing together a substantially flat sheet and a corrugated sheet of metal, usually brass. After the sheets have been brazed together, they are bent into the desired shape of the evaporator. The corrugated sheet, in conjunction with the flat sheet, provides passages or chambers for the refrigerant used in the evaporator.

It has been customary in carrying out the brazing operation to place the sheets and interposed brazing material between dies which clamp the sheets in brazing relation to each other. The assembly is then placed in a furnace and heated to brazing temperature. It has been necessary to make the dies out of alloy steel in order to prevent too great warpage, and even with the use of alloy steel dies, there is some objectionable warpage after they have been used for a considerable time. Warpage of the dies prevents the desired maintenance of contact between the sheets which are to be brazed and, furthermore, their cost is quite considerable.

I have found that the parts to be brazed may be maintained in the desired brazing relation to each other during the operation without the use of dies by applying suction to the space between the parts which are to be brazed.

Referring more particularly to the accompanying drawings, which illustrate the invention as applied to the production of a refrigerator evaporator, the evaporator is made by brazing together a substantially flat sheet 2 and a corrugated sheet 3 while the sheets are assembled as indicated by the full lines in Figure 2. Thereafter, the brazed assembly is bent into the shape shown in chain lines in the same figure. The corrugated sheet forms passageways or chambers 4 which communicate with headers 5 through which the refrigerant flows. One of the headers 5 is provided with a nipple 6 so that suction may be applied to the header and to the passages formed by the corrugated sheet.

In making an evaporator, a sheet 7 of brazing material is placed between the sheets 2 and 3 and the edges of the sheets are folded as indicated by the reference numeral 8. It will be understood that, although the sheets are shown spaced apart in Figure 4, in actual practice the sheets 2 and 3 will be in contact with the brazing sheet 7 at the edges 8 and that the corrugated sheet 3 will be in contact with the brazing sheet at the contact areas 9. The sheets 2 and 3 preferably are brass containing about 80% copper and 20% zinc, although they may be brass sheets of different composition or other metal sheets such as steel. Any suitable brazing material may be employed. The sheet 7 may, for example, contain about 60% copper and 40% zinc. It may be manganese bronze, silver solder or other brazing material.

The assembly of sheets 2, 3 and 7 is then placed in a brazing furnace 10, as indicated in Figure 1. The furnace is preferably heated electrically. The assembly indicated generally by the reference numeral 11 is supported in the furnace by supports 12 mounted on a base 13.

Outside of the furnace is a suction pump 15 connected by a pipe 16 to a reservoir 17 provided with a gauge 18 for indicating the vacuum in the reservoir. The pipe 16 is provided with a regulator 19 and a three-way valve 20. A pipe 21 provided with a gauge 22 connects valve 20 with a flexible hose 23. The hose is connected at its other end to a pipe 24 which extends into the furnace and may be connected to the nipple 6 on the header of the evaporator.

In carrying out the brazing operation, the pipe 24 is connected to the nipple 6 and suction is applied to the header. This maintains the contact areas 9 of the corrugated sheet in contact with the brazing sheet 7, so that the brazing operation may be carried out properly. The sheets are raised to brazing temperature and the suction is applied while the brazing is being performed.

After the brazing operation is completed, the valve 20 is turned so as to establish communication between pipe 21 and pipe 25 leading to the atmosphere, and the evaporator is removed from the furnace. It is then bent into the shape illustrated in chain lines in Figure 2.

The present invention eliminates the necessity of employing expensive alloy steel dies for maintaining the parts to be brazed in contact with each other during the brazing operation. It is applicable to the brazing of parts in general, but is particularly applicable to the brazing of thin brass sheets which are soft enough at the brazing temperature to enable them to be maintained in contact by the suction applied between the sheets. When brazing brass sheets of about .03" to .05" thickness, it is preferred to use a vacuum or suction of about 2" to 6" of mercury. The suction employed should be such as to maintain the parts in contact, but insufficient to cause them to collapse. The suction used in any particular case will depend upon, among other factors, the composition of the parts to be brazed, their thickness, and the shape of the article to be made.

In Figure 4 I have illustrated the brazing sheet 1 as extending continuously, but if desired, it may be cut out at those places under the corrugations where there is no contact.

The term "brazing" is used in a general sense to include soldering or other similar methods of joining metal parts.

I have illustrated and described a present preferred embodiment of apparatus and have described a preferred manner of carrying out the method. It will be understood, however, that the invention may be otherwise embodied or practiced within the scope of the following claims.

I claim:

1. The method of brazing contiguous parts, which comprises assembling the parts with brazing material therebetween to provide a brazing area and a space between said parts to which suction may be applied, and heating the parts to brazing temperature while evacuating said space and maintaining the interior pressure between the parts less than the exterior pressure on the brazing area.

2. The method of brazing contiguous parts, which comprises assembling a substantially flat sheet and a corrugated sheet to provide brazing areas and spaces between said sheets to which suction may be applied, and heating the sheets to brazing temperature while evacuating said space and maintaining the interior pressure between the sheets less than the exterior pressure on the sheets at the brazing area.

3. The method of brazing, which comprises forming a plurality of sheet metal parts to provide when assembled a brazing area and a space between said parts, assembling the parts with brazing material at the brazing area, mechanically securing the boundary edges of the parts, and heating the parts to brazing temperature while evacuating said space and maintaining the interior pressure between the parts less than the exterior pressure on the brazing area.

4. The method of brazing contiguous parts, which comprises assembling the parts to provide a brazing area and a space between said parts to which suction may be applied, establishing a connection between said space and a source of suction, and while maintaining said connection heating the parts to brazing temperature and maintaining the interior pressure between the parts less than the exterior pressure on the brazing area.

5. Apparatus for brazing parts assembled to provide a contact area and a space between said parts, comprising means for raising the assembled parts to brazing temperature, a source of suction, and means establishing communication between said source of suction and said space, said last mentioned means being independent of any passage between the parts at the contact area.

6. Apparatus for brazing parts assembled to provide a contact area and a space between said parts, comprising means for raising the assembled parts to brazing temperature, a source of suction, and means communicating with said source of suction and said space and operative to withdraw gases from said space without the gases passing between the parts at the contact area.

FRANK T. COPE.